United States Patent [19]

Plochman

[11] Patent Number: 5,023,096
[45] Date of Patent: Jun. 11, 1991

[54] FOOD PRODUCT AND METHOD FOR MAKING THE SAME

[75] Inventor: Frederic W. Plochman, Oak Lawn, Ill.

[73] Assignee: NatureStar Foods, Inc., Oaklawn, Ill.

[21] Appl. No.: 423,943

[22] Filed: Oct. 19, 1989

[51] Int. Cl.$^5$ .............................................. A23P 1/08
[52] U.S. Cl. ...................................... 426/89; 426/93; 426/307; 426/384; 426/385; 426/443; 426/444; 426/625
[58] Field of Search .................. 426/89, 93, 384, 443, 426/444, 453, 104, 303, 309, 625, 808, 307, 385

[56] References Cited

U.S. PATENT DOCUMENTS

| | | | |
|---|---|---|---|
| 2,181,109 | 11/1939 | Dodge | 426/303 |
| 2,292,447 | 8/1942 | Irwin, Jr. | 426/384 |
| 3,294,039 | 12/1966 | Ogden | 426/307 |
| 3,573,932 | 8/1971 | Laskin | 426/384 |
| 4,569,847 | 2/1986 | Andrews | 426/307 |
| 4,759,937 | 7/1988 | Spector | 426/104 |
| 4,849,233 | 7/1989 | Hemker | 426/93 |

*Primary Examiner*—Donald E. Czaja
*Assistant Examiner*—D. Workman
*Attorney, Agent, or Firm*—Roper & Quigg

[57] ABSTRACT

A method for producing a food product comprising the steps of providing a base layer of cheese; covering the base with a layer of previously popped popcorn; adding a second layer of cheese on top of and in the interstices of the popcorn layer; heating to melt the cheese and to bond the second layer of cheese and popcorn to the base, thereby forming a structure having a plurality of layers; freezing the structure to form a frozen structure; and freeze-drying the frozen structure; and the resulting food product.

21 Claims, No Drawings

FOOD PRODUCT AND METHOD FOR MAKING THE SAME

BACKGROUND OF THE INVENTION

This invention relates generally to a food product and the method for making such a food product. It is specifically concerned with a snack that is crunchy, yet made without frying or baking and without any additional fats or oils.

In the snack food product art, it is known to use both cheese and popcorn as snacks. It also is known to use cheese-flavored popcorn as a snack. Furthermore, it is known in the snack food product field that pizzas are a common and desired product.

It also is known to use the technology of freeze-drying to preserve food products, such as beef stew, for later use. The freeze-drying process is used to remove the moisture from a product. Currently, such freeze-dried products are sold with the intention that the moisture will be replenished to the freeze-dried product by reconstituting the product with a liquid before consumption.

It also is known in the art that crunchy and salty-tasting foods are desirable as snack food products. Normally, in the snack food art, the crunchy texture of products is derived by frying, commonly in an oil, fat or other shortening, in order to achieve a crunchy texture. Such preparation can add to the fat content of the final product. Further, exposure of fats to the high temperatures encountered in frying oxidizes the fats, resulting in products less desirable in today's health-conscious society.

The existing food products, however, do not provide a crunchy, salty snack food which is a blend of both cheese and popcorn, which requires no refrigeration or preparation, and appears pizza-like.

SUMMARY OF THE INVENTION

This invention provides a new food product and the method of making such a product. The food product is a combination of popcorn and cheese prepared in such a way as to end with a freeze-dried structure containing a plurality of layers alternating between cheese and popcorn. Additionally, the snack food optionally is prepared in a form which appears to be a pizza and indeed has some of the main ingredients of a pizza. The product has a crunchy popcorn-like texture, and a pizza-like taste. Further, such a product is prepared without frying (which would otherwise impart additional oil and fat to the product and, thus, undesirable health characteristics to) the food product.

DETAILED DESCRIPTION

While the present invention can be practiced by use of various steps, the preferred process is set forth below. As used in the specification and the claims the term "cheese" is used to refer collectively to cheese, cheese food, cheese spread or other cheese-like products and is not intended to be limited to products which can be labelled as cheese under federal food labelling guidelines. Throughout the specification and claims the food product produced by the method of this invention will sometimes be referred to as popcorn pizza. It is to be understood, however, that the formation of the product in the form of a pizza and the addition of products other than cheese and popcorn are optional. However, in a preferred embodiment, the product is pizza-like in appearance. The popcorn pizza comprises a plurality of layers including, a cheese base layer, a popcorn layer and a second cheese layer. Optionally, the popcorn pizza also may have layers of a pizza-type sauce topping, or other pizza toppings.

The popcorn pizza is made by providing a substantially uniform base layer of a cheese. One of the advantages of the invention is the ability to create a product without resort to a high-calorie dough crust. Thus, the base of melted cheese normally serves as the structural bottom crust. The base layer of cheese needs to be thick enough to provide the structural characteristics of a base for the product. The base layer may be thicker; however, if the base layer is too thick the final product may be somewhat undesirable, in that, after processing it may require excessive chewing. In general, the thicker the base layer the tougher the final product.

This base layer of cheese may be provided by a very thin slice of cheese, provided however, that such cheese can be sliced thinly without falling apart. Preferably, the base layer is provided by melting shredded cheese, and, more preferably, by melting a finely shredded cheese. Preferably, the melting of the shredded cheese is done by using a container for the preparation of the product. An 8 inch diameter straight-sided pan which is approximately two inches deep is one such acceptable container. The bottom of the pan is covered with a first layer of a shredded cheese. Most preferably, very finely shredded low-moisture part-skim natural mozzarella cheese is used as the first layer. This first layer must be a sufficient amount to provide a thin, but substantially uniform, base of cheese. In an 8 inch diameter pan, about two ounces of finely shredded cheese will provide such a layer.

The first layer of the shredded cheese is then melted to form a substantially uniform base of cheese. The melting step is preferably done by placing the layer of cheese under a heating element. In a preferred embodiment, the pan or other container holding the cheese is placed under one-quarter inch electric heating elements four inches apart which are glowing red with a temperature of 500° F. with the pan placed 8 inches underneath the coils. Preferably, the pan is heated for approximately one minute or until a substantially uniform thin base of melted cheese is formed. While it is preferred to use the above described heating method, it is known within the art that such heating may be accomplished by means other than electric coils and may be accomplished from beneath as well as above the pan. After the substantially uniform base of melted cheese is formed, the base is then cooled until the cheese congeals.

The base of cheese, whether formed by slicing or melting, is covered with a substantially uniform layer of already-popped popcorn. Preferably, the layer of popcorn is from one to one and one-half inches thick. A one to one and one-half inch thick layer of popped popcorn is about two puffed kernels thick. This amount of popcorn provides the preferred structure as hereinafter described, however, more or less can be used if desired for taste or aesthetic reasons. The popcorn may be pre-popped by any existing technology including air popping or oil popping. Moreover, any type of popcorn, including even a flavored popcorn such as white cheddar flavored popcorn, may be used. The only limitation on the popcorn to be used is that the popcorn must be of a type so that the popped popcorn does not char when heated further. It has been found that certain flavored popcorn, as well as popcorn puffs which are coated with an oil that has a low smoke temperature, will not be acceptable as such popcorn will char if heated further.

After the addition of the substantially uniform layer of popped popcorn, a second layer of cheese is added on top of the layer of popcorn. This second layer may be made of the same cheese or of a different cheese from that used in the first layer. Preferably, this second layer of cheese is shredded mozzarella cheese.

This second layer of cheese is dispersed over the popcorn layer so that some of the cheese is located in the interstices of the popcorn layer and some cheese remains on top of the popcorn layer. The purpose of this second cheese layer is, in part, to bond the layer of second cheese and the popcorn layer to the cheese base. Thus, an appropriate amount of cheese must be used. Enough cheese must be used so that, in the ensuing heating step, the cheese will melt and form a cohesive cheese-popcorn-cheese structure. However, if an excess of cheese is used, the ensuing melting step will allow the melted cheese to encompass and completely envelope the popcorn puffs. If the popcorn puffs are encapsulated in the melted cheese, the release of moisture by the cheese will shrivel and degrade the popcorn. Thus, it is important to limit the amount of cheese present in the second layer. However, it must be noted that if too little cheese is used as the second layer, the second layer of cheese and the popcorn layer will not bond to the base layer of cheese to provide the solidification necessary to form the cohesive multi-layer cheese-popcorn-cheese structure which is desired. In the manufacture of an 8 inch diameter popcorn pizza, three to four ounces of cheese is used for the second layer to form an appropriate structure. Generally, in the manufacture of popcorn pizzas of varying sizes, the amount of cheese used in the second layer has been found to be preferably 1 ½ to 2 times by weight of the cheese used in the first layer. This ratio is appropriate when using the 1 to 1 ½ inch layer of popcorn described above.

After constructing the multi-layer structure comprising the base layer of cheese, the layer of popcorn, and the second layer of cheese, the structure is heated until the layer of second cheese melts over the popcorn. Again, any known heating method can be used, however, in the preferred embodiment, the heating is provided by placing the structure 8 inches below one-quarter inch electric heating elements four inches apart which are glowing red at 500° F. for approximately one and one half minutes. This heating step is a very critical step in the practice of this invention. The time of heating, as well as the temperature, is critical because the popcorn layer will collapse if heated for too long a period of time or heated at too high a temperature. The structure is heated only to the melting point of the cheese in the second layer so that the necessary bonding of the second cheese layer and the popcorn layer to the first cheese layer can occur.

After heating the multi-layered structure, the structure is removed from the heat and immediately subjected to freezing. In one embodiment, the structure is immediately placed in a blast freezer at or below −10° F. The timing of the step has been found to be critical. Delay in placing the heated structure with the melted second cheese layer in the freezer will cause the popcorn to absorb moisture from the melted cheese and thus shrivel or degrade the popcorn. Therefore, this step must be performed as quickly as possible after the heating step. Preferably, this step is performed within the ten to fifteen seconds after the heating step is performed. It is desirable to perform this step as quickly as possible after heating; the shorter the time period, the less chance that an undesirable shriveled structure will result. The foregoing step is continued until the entire structure is completely frozen. At −10° F. in a blast freezer, such freezing takes approximately two hours for an 8 inch diameter structure.

After the structure is frozen, the structure can be further treated. One such treatment is to break or otherwise fracture the formed structure into relatively bite-sized pieces which appear somewhat similar to pieces of peanut brittle. In such an embodiment it has been found that white cheddar cheese can be used for both the first and second layers of cheese. Another treatment is making the food product look and taste more like pizza.

The optional improvement steps to make the structure pizza-like include applying small amounts of a tomato-based pizza-type sauce or other similar product to the top of the cheese-popcorn-cheese structure. This step of applying sauce is preferably done after freezing the structure, otherwise the moisture from the pizza-type sauce will degrade the popcorn. If such pizza-type sauce is applied, the structure, including the pizza-type sauce topping, is returned to the freezer for a suitable time, at least until the newly added sauce is frozen. Also, a further optional treatment to make the structure more pizza-like is to add other ingredients normally associated with pizza to the structure. Among the ingredients which can be added are one or more of the meat and vegetable products as are known in the art as being associated with pizza, such as anchovies, bacon, Canadian bacon, chicken, crab, ground beef, ground meat, ground pork, ham, lobster, pepperoni, sausage, shrimp, sliced beef, sliced meat, sliced pork, broccoli, cauliflower, garlic, green peppers, herbs, jalapeno peppers, mushrooms, olives, onions, peppers, spinach and tomatoes. The products can be fresh, frozen, or freeze-dried. The placement of such ingredients in the structure preferably is done by putting such optional ingredients on top of the base layer of cheese either before or after such base is melted. The location of these ingredients below the popcorn layer allows such ingredients to more readily become a part of the cohesive structure. It has been found that, if such ingredients are placed on top of the popcorn layer, the bonding of layers is adversely affected.

Once the structure has been frozen, it is removed from the pan or other container (if such a container has been used), in preparation for the ensuing freeze-drying step. If the product is kept in the frozen state for any substantial period of time before the freeze-drying step described below (for example, in excess of 24 hours), the product should be covered tightly with a material to prevent drying out of the cheese commonly known as freezer burn. Preferably such covering is done tightly with a foil or sheet of plastic.

The frozen structure, removed from its wrapper (if it has been wrapped), then is subjected to a freeze-drying process in a vacuum chamber. The product is freeze-dried, preferably until no more than 3 weight percent moisture remains. This level of moisture is found to achieve the maximum preferred product crispness. The freeze-drying technology is applied as the last step to vaporize directly the ice crystals under vacuum without defrosting the product, thus protecting the crispness of the popcorn from moisture damage and rendering the cheese crisp.

At this point the food product is completely prepared. The product is hydrophyllic; therefore, the freeze-dried popcorn pizza must be packaged in moisture and oxygen resistant packaging for maximum shelf life. Preferably, this is done in an inert atmosphere or in vacuum packing. In the freeze-dried and packaged state, shelf life is nearly indefinite. However, if moisture is allowed to contact the product, the product will degrade in a short period of time.

By the use of the aforementioned method, the otherwise structurally incompatible foods of popcorn and cheese are combined into a new food product creation which preferably possesses the aesthetic presentation of a pizza. The product is consumed as it is from the package without reconstituting the product by the addition of water or other moisture. This provides a new and unique product which is unlike any existing product in taste or "mouth feel."

Further, the heating, freezing and freeze-drying steps expel an amount of the fat from the cheese layers. The globules of fat can be observed in the bottom of the container if one is used and are entirely normal in the described processing. This reduction in the fat content of the final product results in a product which is more healthful than many other snack food products. Moreover, what fat is present in the final product has been subjected to relatively low temperatures, in the range of the melting point of cheese. Because the fats which are present in the final product have not been oxidized by exposure to the extreme heat of frying or baking, such fats are believed to be more healthful as compared to oxidized fats present in other food products.

Those skilled in the art will recognize that the above recited steps can easily be modified and that such modifications are within the spirit and scope of the invention. Moreover, those skilled in the art will readily recognize that the heating, freezing and freeze-drying steps can vary in timing, temperatures and procedures depending on the types and sizes of equipment used.

Having described the invention, what is claimed is:

1. A method for producing a crunchy freeze-dried food product to be consumed in its non-reconstituted state comprising the steps of:
   (a) providing a base layer of cheese;
   (b) covering said base layer of cheese with a substantially uniform layer of popped popcorn;
   (c) adding a second layer of a cheese on top of and within the interstices of said layer of popcorn;
   (d) heating to melt said second layer of cheese to bond said second layer of cheese and said layer of popcorn to said base layer of cheese, thereby forming a structure having at least three layers bonded together;
   (e) freezing said structure to form a frozen structure; and
   (f) freeze-drying said frozen structure to provide a crunchy freeze-dried food product to be consumed in its non-reconstituted state.

2. The method of claim 1 wherein the second layer of cheese is shredded cheese.

3. The method of claim 1 wherein the step of providing a base layer of a cheese comprises the steps of:
   providing a first layer of a shredded cheese;
   heating said first layer of shredded cheese to form a substantially uniform base layer of melted cheese; and
   cooling said base layer of melted cheese.

4. The method of claim 3 wherein the second layer of cheese is shredded cheese.

5. The method of claim 3 wherein the first layer of cheese is a substantially uniform layer of finely shredded low-moisture part-skim natural mozzarella cheese.

6. The method of claim 5 wherein the second layer of cheese is shredded cheese.

7. The method of claim 1 further comprising the step of:
   adding a tomato-based pizza-type sauce to the frozen structure and refreezing the resulting structure;
   wherein the addition of said sauce occurs before the freeze-drying step.

8. The method of claim 7 wherein the second layer of cheese is shredded cheese.

9. The method of claim 7 wherein the step of providing a base layer of a cheese comprises the steps of:
   providing a first layer of a shredded cheese;
   heating said first layer of shredded cheese to form a substantially uniform base layer of melted cheese; and
   cooling said base layer of melted cheese.

10. The method of claim 9 wherein the second layer of cheese is shredded cheese.

11. The method of claim 7 further comprising the step of:
    placing an ingredient selected from the group consisting of anchovies, beef, pork, chicken, crab, lobster, shrimp, broccoli, cauliflower, garlic, herbs, mushrooms, olives, onions, peppers, spinach, tomatoes and mixtures thereof within said structure.

12. The method of claim 11 wherein the second layer of cheese is shredded cheese.

13. The method of claim 11 wherein the step of providing a base layer of a cheese comprises the steps of:
    providing a first layer of a shredded cheese;
    heating said first layer of shredded cheese to form a substantially uniform base layer of melted cheese; and
    cooling said base layer of melted cheese.

14. The method of claim 13 wherein the second layer of cheese is shredded cheese.

15. The method of claim 1 wherein said freeze-drying step is conducted until the structure contains no more than 3 weight percent moisture.

16. A method for producing a crunchy freeze-dried food product to be consumed in its non-reconstituted state comprising the steps of:
    (a) providing a base layer of cheese comprising the steps of:
       (i) providing a first layer of a shredded cheese;
       (ii) heating said first layer of shredded cheese to form a substantially uniform base layer of melted cheese; and
       (iii) cooling said base layer of melted cheese;
    (b) covering said base layer of cheese with a substantially uniform layer of popped popcorn;
    (c) adding a second layer of a cheese on top of and within the interstices of said layer of popcorn;
    (d) heating to melt said second layer of cheese to bond said second layer of cheese and said layer of popcorn to said base layer of cheese, thereby forming a structure having at least three layers bonded together;
    (e) freezing said structure to form a frozen structure;

(f) adding a tomatobased pizza-type sauce to the frozen structure and refreezing the resultant structure; and (g) freeze-drying said refrozen resulting structure until said structure contains no more than 3 weight percent moisture to provide a crunchy freeze-dried food product to be consumed in its non-reconstituted state.

17. The method of claim 16 further comprising the step of:

placing an ingredient selected from the group consisting of anchovies, beef, port, chicken, crab, lobster, shrimp, broccoli, cauliflower, garlic, herbs, mushrooms, olives, onions, peppers, spinach, tomatoes and mixture thereof within said structure.

18. A crunchy freeze-dried food product to be consumed in its non-reconstituted state comprising a freeze-dried cohesive structure of a plurality of layers comprising a base layer of cheese, an intermediate layer of popped popcorn and a second layer of a cheese on top of an din the interstices of said layer of popcorn.

19. The food product of claim 18 further comprising a tomato-based pizza-type sauce.

20. The food product of claim 19 further comprising an ingredient selected from the group consisting of anchovies, beef, pork, chicken, crab, lobster, shrimp, broccoli, cauliflower, garlic, herbs, mushrooms, olives, onions, peppers, spinach, tomatoes and mixtures thereof.

21. The food product of claim 20 wherein the entire structure contains no more than 3 weight percent moisture.

* * * * *